(12) United States Patent
Heynemann et al.

(10) Patent No.: US 7,308,522 B2
(45) Date of Patent: Dec. 11, 2007

(54) METHOD AND APPARATUS TO ALLOW DYNAMIC VARIATION OF ORDERING ENFORCEMENT BETWEEN TRANSACTIONS IN A STRONGLY ORDERED COMPUTER INTERCONNECT

(75) Inventors: Tom A. Heynemann, Boulder Creek, CA (US); Jeffrey A. Sprouse, Mountain View, CA (US); Michael W. Knowles, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 10/864,617

(22) Filed: Jun. 9, 2004

(65) Prior Publication Data

US 2004/0225823 A1 Nov. 11, 2004

Related U.S. Application Data

(63) Continuation of application No. 10/035,983, filed on Dec. 24, 2001, now Pat. No. 6,754,737.

(51) Int. Cl.
*G06F 13/36* (2006.01)

(52) U.S. Cl. .................. 710/310; 710/311; 710/306

(58) Field of Classification Search ............. 710/39, 710/54, 56, 110, 112, 305–306, 310; 712/216, 712/217
See application file for complete search history.

(56) References Cited

U.S. PATENT DOCUMENTS

| | | | |
|---|---|---|---|
| 5,432,918 A | * | 7/1995 | Stamm ................. 711/156 |
| 6,026,451 A | | 2/2000 | Sreenivas |
| 6,047,120 A | * | 4/2000 | Bell ....................... 703/27 |
| 6,108,741 A | * | 8/2000 | MacLaren et al. ......... 710/314 |
| 6,138,192 A | * | 10/2000 | Hausauer .................. 710/100 |
| 6,175,888 B1 | * | 1/2001 | Guthrie et al. ............. 710/310 |
| 6,301,630 B1 | * | 10/2001 | Chen et al. ............... 710/310 |
| 6,425,024 B1 | | 7/2002 | Kelley et al. |
| 6,615,295 B2 | | 9/2003 | Shah |

(Continued)

OTHER PUBLICATIONS

'Multiplexer' in "Microsoft Press Computer Dictionary". Second Edition. Microsoft Press. 1994. p. 265. ISBN 1-55615-597-2.*

(Continued)

*Primary Examiner*—Mark H. Rinehart
*Assistant Examiner*—Thomas J Cleary

(57) ABSTRACT

A method of enforcing the ordering of read and write transactions for an adapter unit connected to a strongly-ordered bus. The adapter unit has a set of read buffers and write buffers. Initiator write transactions and target read completion transactions are performed on the bus in the original order in which the transactions are received. An initiator read transaction request is enqueued in the read buffer but selectively awaits the performance of one or more pending initiator write transactions in the write buffer before the read transaction request is presented to the bus. In this way, initiator write transactions on which the read transaction request depends and pending in the write buffer are retired to the bus before the initiator read transaction request is performed, thus assuring that the initiator read transaction request is not performed ahead of the initiator write transaction on which the read transaction request depends.

14 Claims, 6 Drawing Sheets

U.S. PATENT DOCUMENTS

| | | | |
|---|---|---|---|
| 6,754,737 B2* | 6/2004 | Heynemann et al. | 710/39 |
| 2002/0073258 A1* | 6/2002 | Riley et al. | 710/105 |
| 2003/0126029 A1* | 7/2003 | Dastidar et al. | 705/26 |
| 2003/0131175 A1* | 7/2003 | Heynemann et al. | 710/310 |

OTHER PUBLICATIONS

'Multiplexing' in "The Free On-Line Dictionary of Computing". Online Feb. 2, 1995. Retrieved from Internet Oct. 24, 2006. <http://foldoc.org/index.cgi?query=mux>.*

* cited by examiner

METHOD AND APPARATUS TO ALLOW DYNAMIC VARIATION OF ORDERING ENFORCEMENT BETWEEN TRANSACTIONS IN A STRONGLY ORDERED COMPUTER INTERCONNECT

CROSS-REFERENCE TO RELATED APPLICATIONS

This application is a continuation of application Ser. No. 10/035,983, filed on Dec. 24, 2001, now U.S. Pat. No. 6,754,737 which is hereby incorporated by reference herein.

This application is related to U.S. Application entitled "Method And Apparatus For Ensuring Multi-Threaded Transaction Ordering In A Strongly Ordered Computer Interconnect," filed on Dec. 24, 2001, Ser. No. 10/035,988.

BACKGROUND

The present invention relates generally to transactions on a computer interconnect and, more specifically, to the ordering of read and write transactions on a computer bus.

FIG. 1 shows the architecture of a typical computer system 8 in which a high-speed bus, such as the PCI bus 10, interconnects several I/O device adapters 12, 14. Each I/O device adapter 12, 14 is either an initiator or a target and the PCI bus (or PCI-X bus) serves to carry read and write transactions between the I/O device to which the adapter is connected. The CPU 16 for the computer system is connected to the bus 10 by means of a bridge device 18 which also provides a path between the CPU 16 and main memory 20. Another bridge device 22 connects a slower bus 24 to which devices, such as a printer adapter 26, and keyboard and mouse interfaces 28, are connected.

In one version of the PCI bus 10, an initiator (master) connects to a target (slave) via the bus to perform a transaction. FIG. 2 shows a typical PCI read transaction 40, a write transaction 42, and a retry request 44. Read transactions include an address phase 46, a command phase 48, one or more data phases 50a-d and attribute phases 52a-d. Each of the data phases 50a-d can be delayed by the target or initiator for a specific number of clocks in order to match the data transfer speed of the target to the initiator. Write transactions are similar, having an address phase 54, a command phase 56, one or more data phases 58a-d, and attribute phases 60a-d. The initiator or target can stall a data phase (via wait states) for up to seven clocks. (The target can stall the start of the first data phase for up to 15 clocks). Before the initiator can connect to a target to perform a data transaction, the initiator must become the owner of the bus. This implies that the initiator must be the winner of an arbitration process.

In addition to data transactions, the PCI bus supports Delayed Transactions for reads and writes. A Delayed Transaction has two parts, the request part and the completion part. In the first part 44 in FIG. 2, the initiator performs an address phase 62 and command phase 64, and before the first data phase 66, the target responds with a disconnect 68, as shown in FIG. 2. The initiator interprets the target disconnect to be a retry request 44, which the initiator honors by ending the current transaction (FIG. 2), returning the bus to the idle state, re-arbitrating for ownership and re-initiating the transaction. If the initiator again receives a retry indication from the target, the initiator repeats the above sequence 44. Thus, the address phase 62, may be repeated several times (causing multiple re-arbitrations as well), until the target is ready to transfer data. In the completion part of the Delayed Transaction, the initiator performs an address phase and the target replies with a data transfer rather than a disconnect 68.

It is easily appreciated by one skilled in the art that the above-described operation of the PCI bus is exceedingly inefficient. Throughput on the PCI bus is lost for two reasons, the insertion of wait states and the use of the retry protocol.

Wait states cause a direct loss in throughput. Just one wait state inserted in each data phase is a 50% loss in throughput during the data burst. This means that for a 32 bit PCI bus clocked at 33 MHz, the throughput during the data phase is reduced to 66 Megabytes per second from 132 Megabytes per second. If the bus were clocked at 66 MHz, the throughput loss is even greater—a full 132 Megabytes per second of loss. For devices that can sustain transfer rates of about 1 Gigabyte per second, the bus is simply unworkable.

The Delayed Transaction protocol also causes a significant loss in throughput because bus cycles that could be used for data transfers are used to support a high-overhead protocol. Bus cycles are wasted when the target replies with a disconnect, when the initiator ends the current transaction, lets the bus go idle, re-arbitrates for the bus, and initiator then re-performs the address phase of the disconnected transaction. Thus, the cost of each retry is at least 6 clocks, 4 clocks to return the bus to the idle state, at least one clock for arbitration, and at least one more clock for an address phase. During these 6 clocks an entire 4 dword burst could have occurred.

In both of these cases throughput was lost because the target was not ready to respond. Clocking the bus faster to improve the throughput only causes more clock cycles to be lost due to wait states and the inefficient Delayed Transaction protocol.

An updated version of the PCI bus, PCI-X, was developed to address these and other deficiencies. In the PCI-X specification, wait states are not permitted once data transfers have begun. A data burst, once started, must proceed at full speed on the bus. The read, write and split request transactions for PCI-X are shown for reference in FIG. 3. Each transaction type has an Address/Cmd phase, followed by an attribute phase and a response phase. After the response phase a data transfer ensues. Only the response and first data phase are extensible by adding a limited number of wait states. After the first data phase, the remaining data phases must proceed at one bus clock per data phase.

Additionally, in the PCI-X specification, the inefficient Delayed Transactions have been replaced by Split Transactions, as shown in FIG. 3.

In a Split Transaction, a Requester initiates a transfer 75 by performing an address/cmd phase 86, an attribute phase 88, a response phase 90, an unused data phase 92 and a surrender phase 94. Upon receiving a Split Response Request 96 from a Completer at the appropriate time in the transaction, the Requester removes itself from the bus, commits resources to the transaction and suspends the transaction until the Completer responds. This makes the bus available for use to other Requesters and Completers in the interim. When the data transfer is ready to occur at the Completer, the Completer acts as an Initiator, obtaining the bus and performing a Split Completion transaction 71, which includes an address phase 70, an attribute phase 72, a response phase 74 and one or more data phases 76a-d during which the requested data is transferred to the Requester.

To make it easier to conform to the newer PCI-X specification and to improve the performance of the older PCI protocol, it is best that both the Requester and Completer are implemented with read and write storage buffers so that when a write or read data burst is ready to occur, it can proceed at full bus speeds. Additionally, both the Requester and Completer are likely, in most implementations, to have Initiator and Target interfaces to carry out the Split Transaction protocol and each interface is required to be registered on both inputs and outputs.

However, the use of read and write buffers and Initiator and Target interfaces on the adapter increases the chances that PCI and PCI-X read/write ordering and deadlock avoidance rules may not be met.

PCI bus ordering rules require that if write data is posted to a write buffer (such as a posted-write buffer in a PCI-to-PCI or host/PCI bridge) the data must be flushed to its final destination (memory) before a read of that same data is allowed by the same or different bus master. Also, a bridge must perform all posted writes in the same order in which they were originally posted and is only permitted to post writes to regular memory targets.

On the PCI-X bus, there are more extensive read-write ordering rules when buffers are involved because of Split Transactions. For example, for bridges between a PCI-X bus and a host bus or between two PCI-X busses, there are three sets of rules, as set forth, in summary, below. The rules are set forth in more detail on pages 573-577 of PCI-X System Architecture, Tom Shanley, ISBN 0-201-72682-3, which is incorporated by reference into the present application.

Case I. A posted memory write transaction (PMW) is received in a bridge.
 (i) a subsequent split read request (SRR) or split write request (SWR) cannot be reordered to avoid returning incorrect read data (SRR) and to maintain write ordering (SWR);
 (ii) a subsequent split read completion (SRC) generally cannot be reordered to avoid returning incorrect read data;
 (iii) a subsequent split write completion may be permitted because the writes are in different directions; and
 (iv) a subsequent PMW generally cannot be performed until the first PMW is completed and PMWs must complete in the order received to maintain write ordering;

Case II—A split read request (SRR) or split write request (SWR) occurs at a bridge.
 (i) a subsequent split read request or split write request can be reordered;
 (ii) a subsequent split read completion, or split write completion or posted memory write must be allowed ahead of the SRR or SWR to avoid a deadlock;

Case III—A split read completion (SRC) or a split write completion (SWC) occurs at a bridge.
 (i) a subsequent split read request (SRR), split write request (SWR), split read completion (SRC) or split write completion (SWC) can be reordered;
 (ii) a posted memory write must go ahead of the SRC or SWC to avoid a deadlock.

Though there are some exceptions to these rules if a relaxed ordering (RO) bit is set in a transaction, the rules set forth the ordering of reads and writes so as to guarantee the proper operation of system software (Case I) and the avoidance of deadlocks (Cases II and III) for a bridge between the host bus and a PCI-X bus or between two PCI-X busses.

The use of read and write buffers and both an Initiator and Target interface on adapter units connected to the PCI bus along with the split transaction protocol creates a need to maintain certain ordering of read and write transactions on the adapter units.

Currently, one method of dealing with the ordering problem is to control all of the read-write transaction activity from a single thread, thereby serializing all of the transactions from a single point of control. While this may assure that the ordering problem is correctly addressed, the single thread approach is performance limiting both to the adapter and the system.

Therefore, there is a need to address the ordering problem on an adapter that has read and write buffers, Initiator and Target interfaces that connect to a strongly-ordered bus, such as the PCI or PCI-X bus, and a split transaction protocol, without using a single thread to serialize all of the activity of the adapter. The present invention is directed towards such a need.

BRIEF SUMMARY

The present invention provides an apparatus and method for meeting the ordering rules of PCI and PCI-X on an adapter unit connected to the PCI or PCI-X bus. The adapter unit has both an Initiator and Target interface for handling delayed or split transactions. In addition, the adapter unit is capable of multi-threaded operation, supporting more than one read or write transaction thread.

In accordance with one version of the present invention, buffer sharing is used to enforce ordering between split or delayed read completions (SRC, supplied by the target interface) and a write transaction (supplied by the initiator interface and posted in the adapter unit's local write buffer) and between two successive write transactions. The SRCs are queued in the same buffer as the write transactions so that they occur on the PCI bus in the order in which they originally occurred. This meets the Case I (ii) rule.

Ordering is enforced between initiator read transaction requests and posted initiator write transactions by write contingency flags. Whenever the initiator interface of the adapter unit issues a read transaction request, write contingency flags are set for the read transaction request, one for each pending initiator write that was accepted prior to the requested initiator read transaction request but not performed on the PCI bus. When a write transaction is performed on the bus, the contingency flag corresponding to the write transaction is cleared in all pending initiator read transaction request requests and when all the write contingency flags have been cleared for a particular initiator read transaction request, the initiator read transaction request is then permitted on the bus. This meets the Case I (i) rule.

In another version of the invention, read transaction requests are either ordered or non-ordered. Ordered read transaction requests have their write contingency flags set, whereas non-ordered read transaction requests do not. Whenever an ordered read transaction request is accepted, write contingency flags are set in the read transaction context for each pending write, i.e., writes that were accepted prior to the read and not yet performed on the PCI bus. Whenever a pending write is performed on the PCI bus, the contingency bits in the read context are cleared. For non-ordered read transaction requests, the write contingency flags are not set. A read transaction request is not presented on the PCI bus until all write contingencies are cleared for that read transaction request.

In yet another version of the invention, read transaction requests are selectively ordered, i.e., the read transaction requests are dependent on the retiring of selected ones of the pending write transactions. This selectively ordering is based on the properties of either the read transaction request, or one or more pending write transactions, or both. Properties of these transactions for the purpose of selectively ordering the read and write transactions include, but are not limited to, the address or address range of the transaction, and transaction attributes, such as the requester function number, the requester device number and the relaxed ordering attribute bit.

One method, in accordance with the present invention, is a method for enforcing ordering between read and write transactions for an adapter unit configured to connect to a bus, where the adapter unit has at least one read buffer and at least one write buffer containing a plurality of slots. The method includes the steps of enqueuing, in the write buffer, a first initiator write transaction to be performed on the bus and enqueuing, in the write buffer, a second initiator write transaction to be performed on the bus after the first initiator write transaction. An initiator read transaction request is received, in the read buffer, where the read buffer has a read context register for the initiator read transaction request. The read context register includes a write contingency flag entry for each slot of the plurality of slots in the write buffer. Performance, on the bus, of the read transaction request is required to follow the performance, on the bus, of the first initiator write transaction, but not the second initiator write transaction. The write contingency flags are cleared in the read context register for the initiator read transaction request, and if, after receiving the read transaction request, the performance of the first and second initiator write transactions have not started on the bus, the following steps occur (i) a write contingency flag associated with the slot in the write buffer occupied by the first write transaction is set, in the read context register, to indicate the dependence of the read transaction request on the first initiator write transaction in the write buffer, (ii) the first write transaction on the bus is performed, (iii) after the performance of the write transaction is completed, the write contingency flag of the first write transaction in the read context register is cleared. If the write contingency flag of the first write transaction is not set in the read context register, the read transaction request is performed on the bus.

Additionally, the method includes enqueuing a target read completion transaction in the write buffer, where the target read completion transaction has a position in the write buffer either before or after the initiator write transaction based on whether the target read completion originally occurred before or after the initiator write transaction, and performing on the bus the transactions in the write buffer in the order in which the transactions were enqueued.

One advantage of the present invention is that the ordering rules of the PCI or PCI-X bus are not exported to any of the data sources or sinks with which the adapter unit of the present invention interoperates.

Another advantage of the present invention is that the flexibility of using ordered or non-ordered read transaction requests permits higher bandwidth and eliminates the chance of a dead-lock condition. Transactions that are independent of each other need not be burdened with the ordering rules, whereas transactions that are inter-dependent are burdened with the ordering rules so that correct software operation is assured.

Yet another advantage is that a multi-threaded adapter unit can be employed on the PCI bus. This type of adapter unit permits more than one outstanding split read or write transaction on the PCI bus without risk of an ordering violation or deadlock.

BRIEF DESCRIPTION OF THE DRAWINGS

These and other features, aspects and advantages of the present invention will become better understood with regard to the following description, appended claims, and accompanying drawings where:

DETAILED DESCRIPTION

Figure 1:
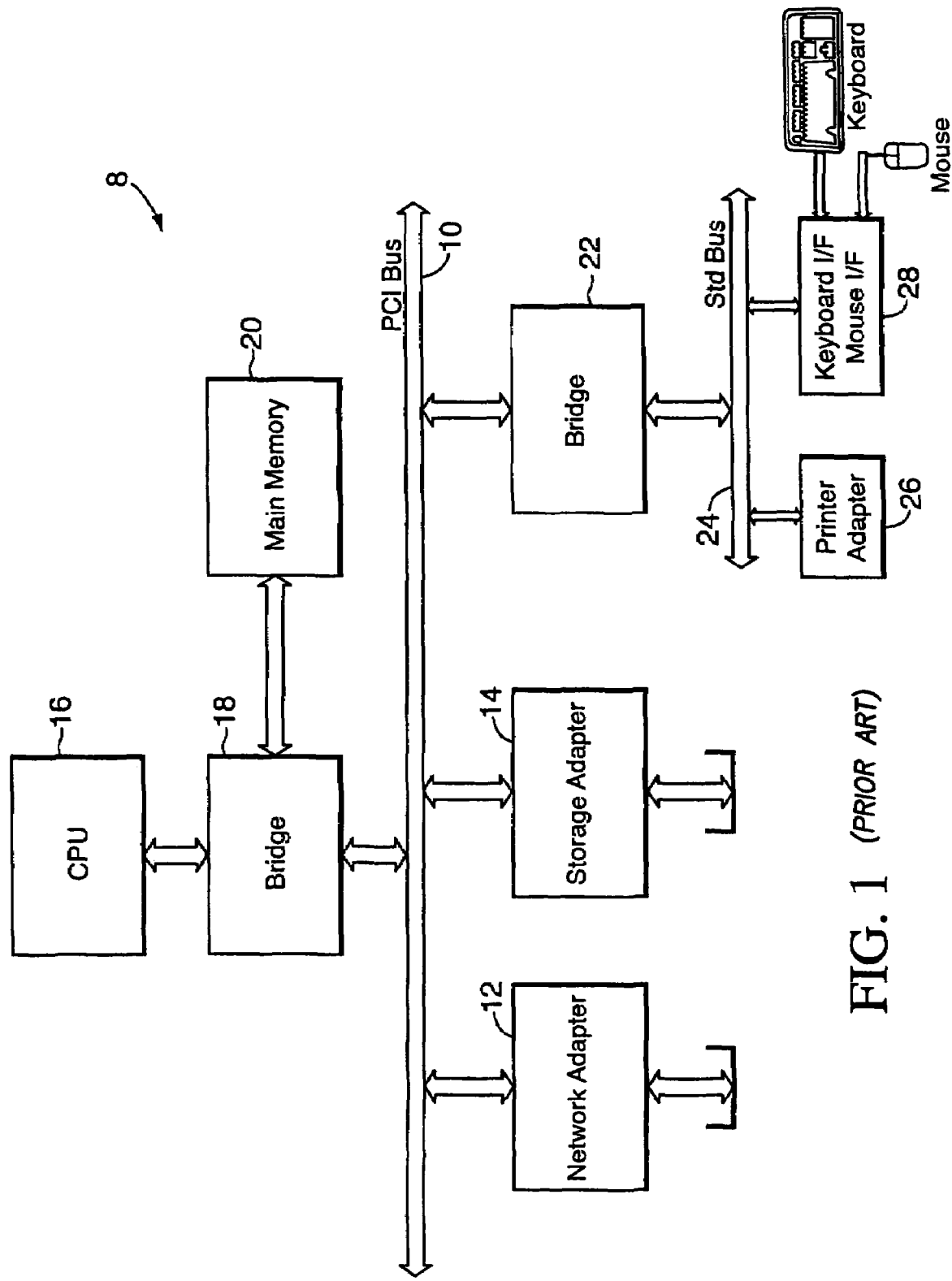
FIG. 1 shows the architecture of a typical computer system in which a high-speed bus, such as the PCI bus, interconnects several I/O device adapters.
Figure 2:
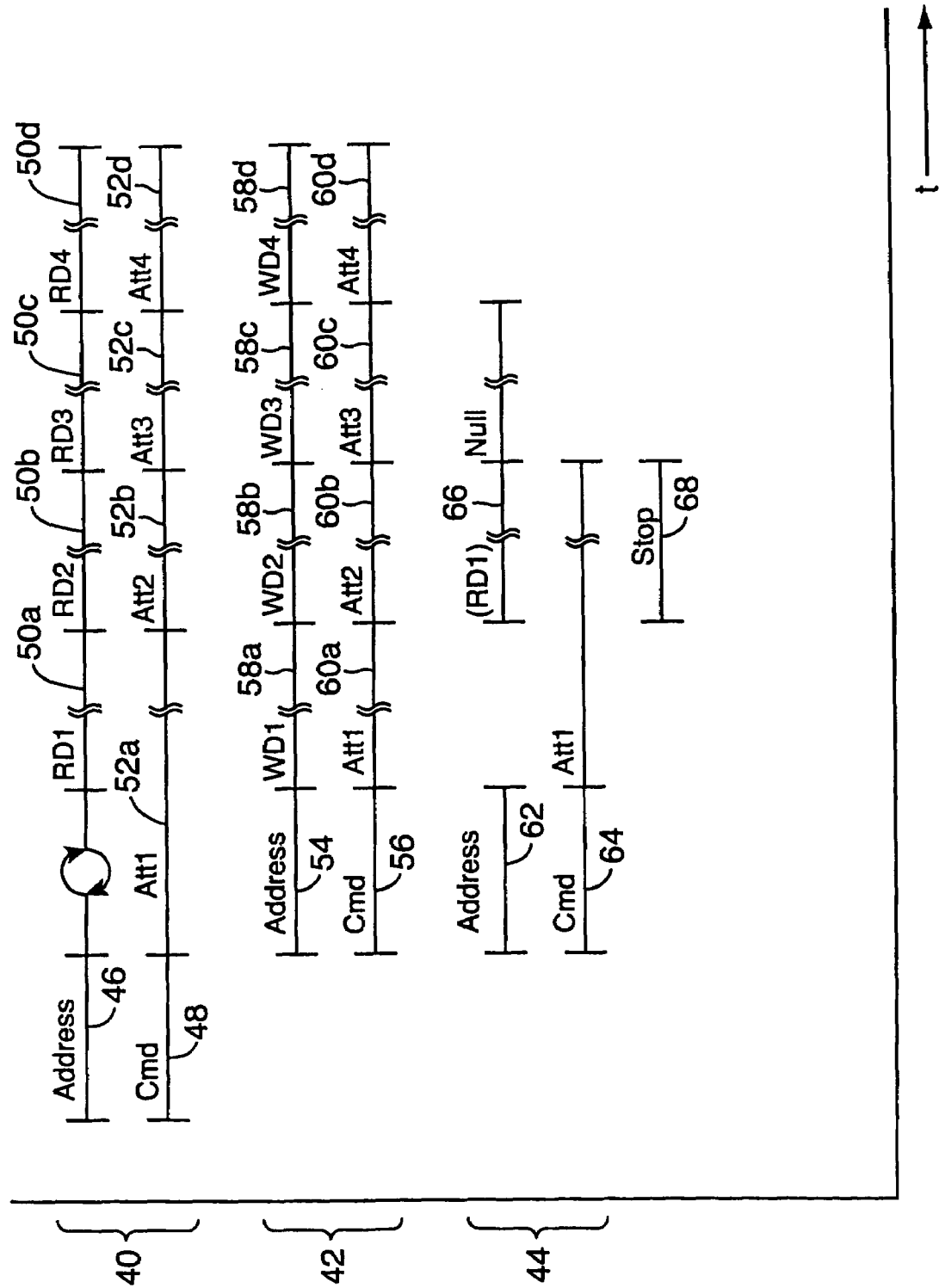
FIG. 2 shows a typical PCI read, write and retry operation.
Figure 3:
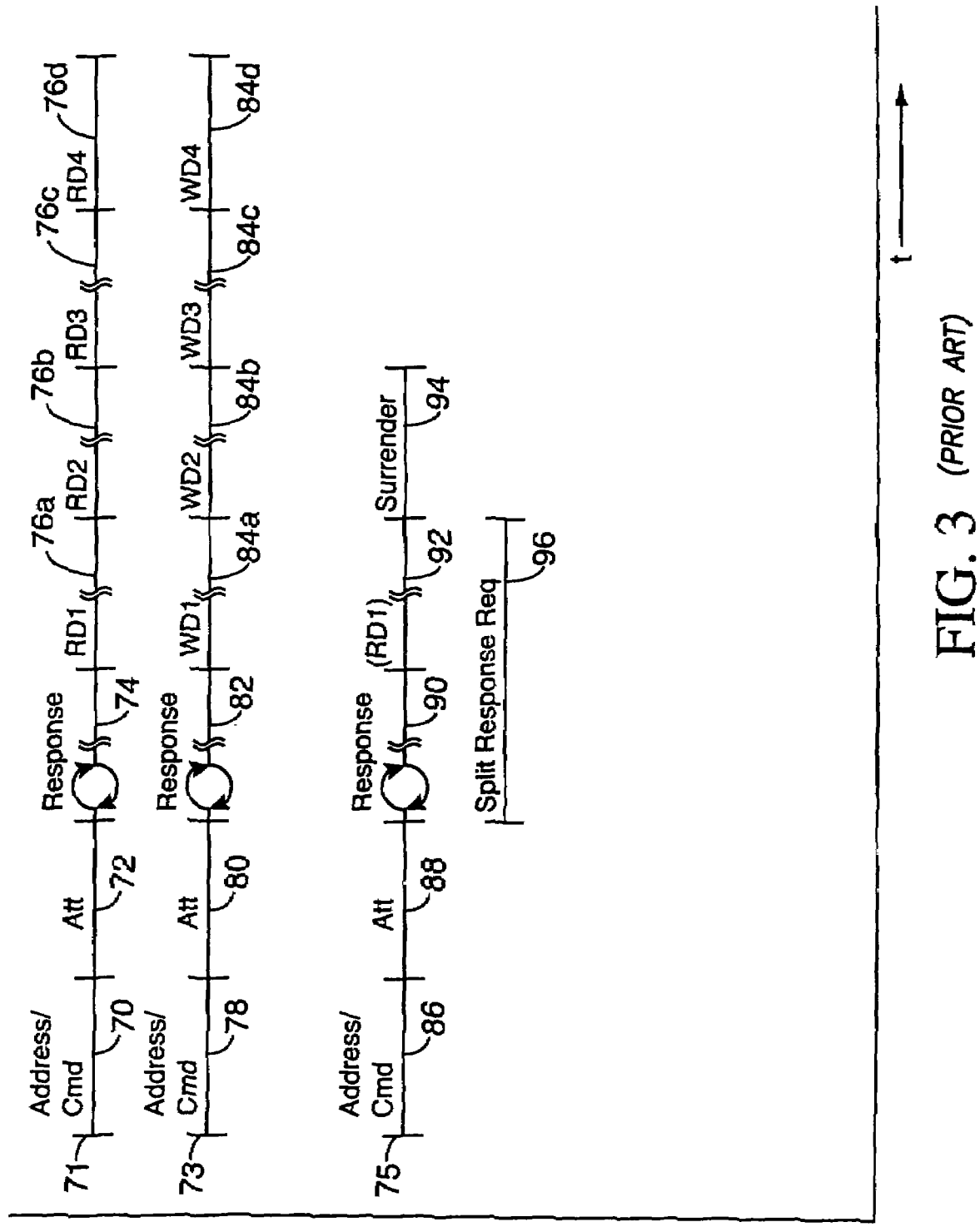
FIG. 3 shows a typical PCI-X read, write and split response operation.
Figure 4:
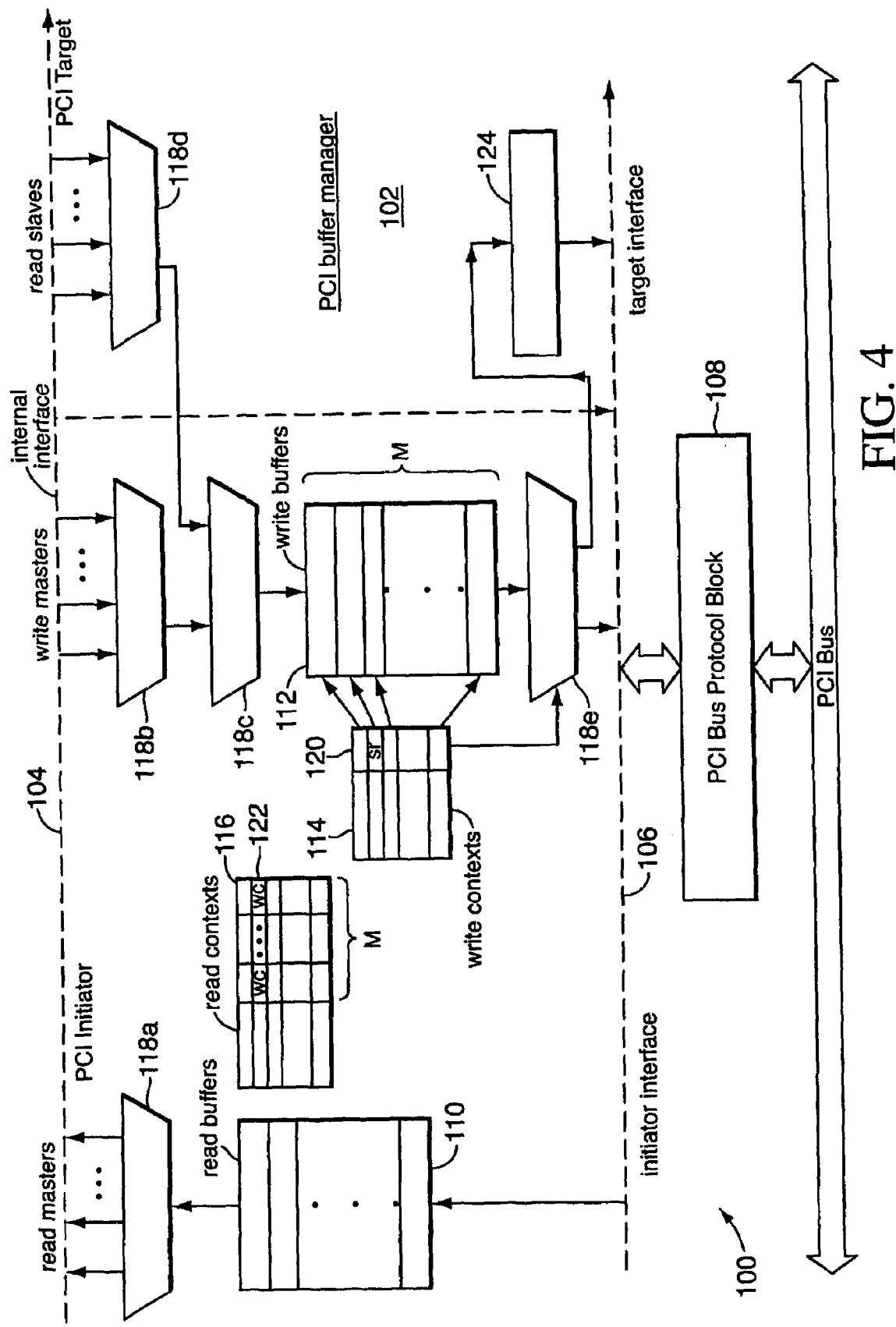
FIG. 4 shows the configuration of the adapter unit interface to the PCI bus.

FIG. 4 shows the configuration of the adapter unit interface 100 to the PCI bus. The adapter unit 100 includes a PCI buffer manager section 102 that has two interfaces 104, 106. A first interface 104 is an internal interface to the functional sections of an application specific device. A second interface 106 is an interface to a PCI bus protocol block 108, which connects to the PCI bus and is responsible for carrying out the PCI specific protocols, such as dword commands and burst commands. The latter include memory read, memory write, memory read block, memory write block and delayed and split completions.

Included in the PCI buffer management section 102 are a plurality of read buffers 110 and write buffers 112, a set of write context registers 114 for tracking the contents of the write buffers, a set of read context registers 116 for tracking write contingency flags for the read buffers 110, and a plurality of multiplexors 118a-e or data selectors for routing data. Each write context register 114 is associated with one entry of the M write buffers 112 and contains a bit (one of sr bits 120) that indicates whether the associated entry is an initiator write transaction or a target read completion transaction. Each read context register 116 is associated with one entry of the read buffers 110 and contains M wc bits 122, each of which, if set, indicates the presence of a single pending write in the write buffer that is ahead of the initiator read transaction request in the read buffer. As is shown in FIG. 4, there are as many wc bits (M) in the read context register as there are write buffers (M). This arrangement permits a read transaction request in the read buffer to be dependent on selected ones of the write transactions in the write buffer. The decision of whether to set a wc bit to create an ordering between a write transaction and a read transaction request is based on the properties of the read and write transactions involved. Such properties can include the address or address ranges of the transactions and the attributes of the transactions such as the requester function or device number in the transaction.

A number of multiplexers (or data selectors) are provided including multiplexer 118a for providing read buffer data to one or more read masters in the application specific section of the adaptor, multiplexer 118b for selecting a write master to provide data to the write buffers, multiplexer 118d for selecting a read slave to provide data to the write buffers and a multiplexer 118c for selecting whether a read slave or a write master has access to the read buffers. Finally, a de-multiplexer 118e is provided for enabling write buffer data to either an initiator interface part or a target interface part of interface 106 via registers 124, depending on the sr flags 120 stored in the write context registers.

Figure 5:
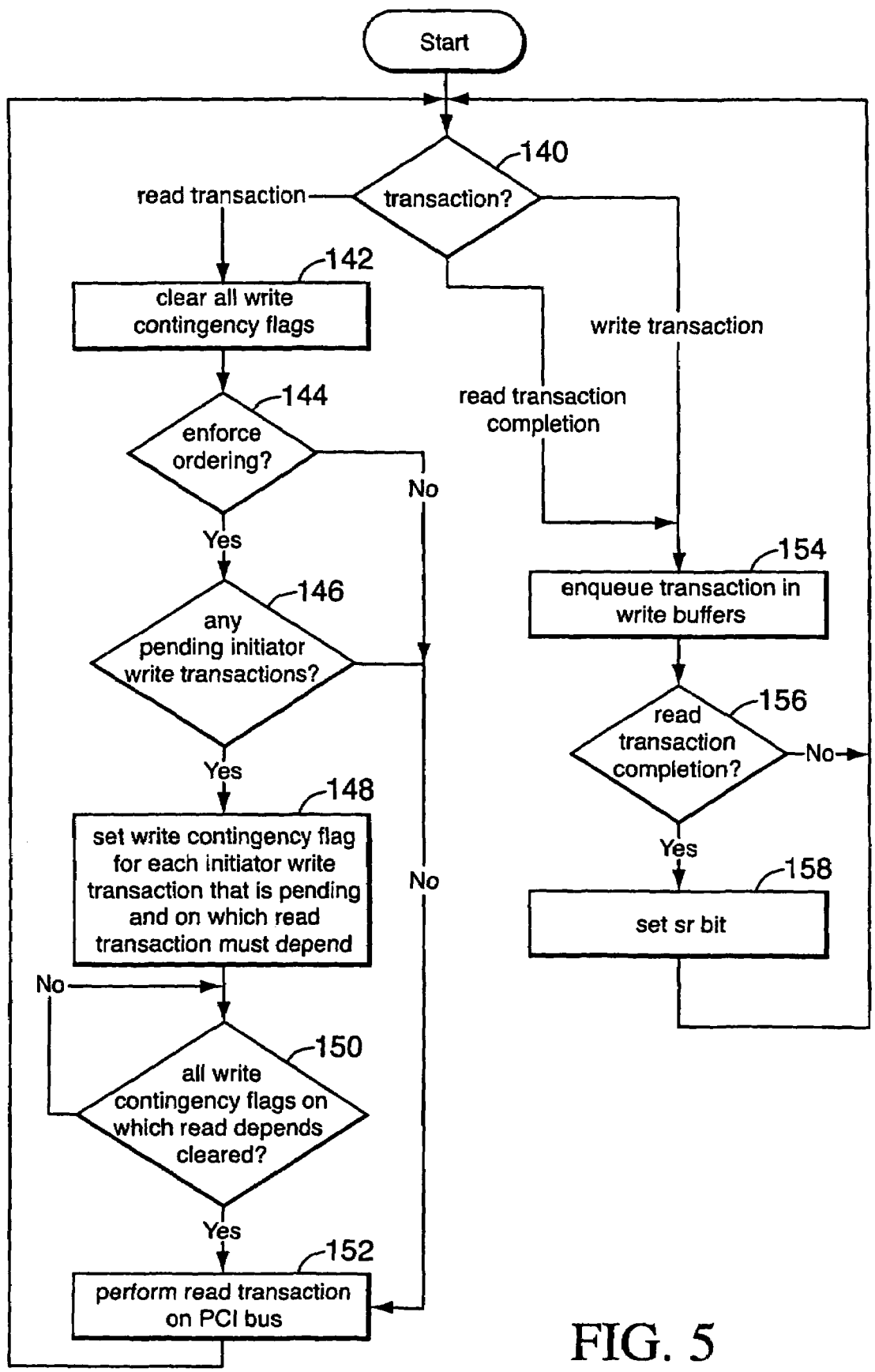
FIG. 5 shows a flow chart for handling initiator read and write transactions and target read completions.

FIG. 5 shows a flow chart for handling initiator read and write transactions and target read completions. When a read transaction request appears on the internal interface, as determined in step 140, all of the write contingency flags for the read transaction request are cleared, in step 142, and if ordering is enforced, as determined in step 144, then a test is made, in step 146, to determine whether there are any pending initiator write transactions. These are write transactions in the write buffers that have been accepted by the write buffer before the appearance of the read transaction request but whose performance on the PCI bus has not started. If there are pending initiator write transactions, then a write contingency flag for each pending write transaction on which the read transaction request must depend is set, in step 148, in the read context register for the read transaction request that just appeared. The read transaction request then waits, in step 150, for all of the write contingency flags that were set for the read transaction request to be cleared, before being presented to the initiator interface and thus to the PCI bus, in step 152. The contingency flags thus assure proper ordering between initiator read transaction requests and initiator write transactions. If ordering is not enforced, as determined in step 144, or there are no pending initiator write transactions for the read transaction request, as determined in step 146, then the read transaction request proceeds without delay, in step 152. If ordering is not enforced, improvements in throughput of the adapter unit are possible, because read transaction requests are not delayed by any pending write transactions. Selective ordering is also possible, whereby the read transaction request may be ordered with respect to some pending write transactions and not others. In this case, only those write contingency flags pertaining to pending write transactions on which the read transaction request must wait are set.

If a write transaction is presented on the internal interface, as determined in step 140, the write transaction is enqueued, in step 154, in one of the available write buffers. If a read transaction completion appears on the internal interface, as determined in step 140, it too is enqueued, in step 154, in one of the available write buffers and the sr bit is set, in step 158, as determined in step 156. This transaction is a delayed or split completion to a read transaction request that was issued by a source external to the adapter unit, which signaled a delayed or split response to the read request. The sr bit in the write context registers keeps track of whether the entry in the write buffer is a write transaction or a delayed or split completion transaction. The queuing of initiator write transactions and target read completions assures that these transactions are performed in the order in which they are enqueued in the write buffer.

Figure 6:
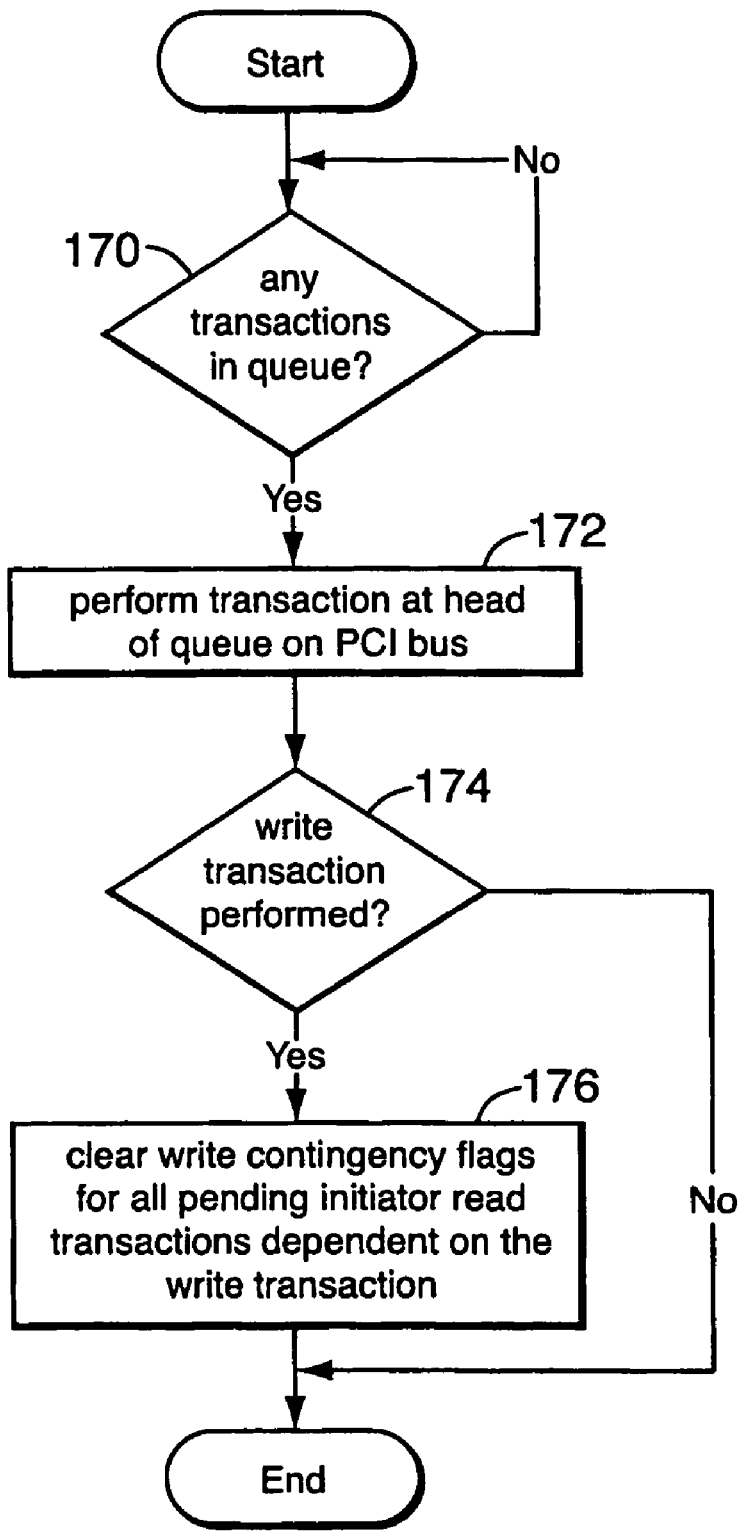
FIG. 6 show a flow chart for operating the write buffer in an adapter unit.

FIG. 6 show a flow chart for operating the write buffers 112 in an adapter unit. In this process, if there are any transactions in the write buffers 112, as determined in step 170, the transaction at the head of the queue is performed on the PCI bus by presenting it to the PCI Bus Protocol block 108. If a write transaction is the transaction performed in step 172, as determined in step 174, then the write contingency flags for that write transaction are cleared, in step 176, in each read context register in which they are set, i.e., for all pending initiator read transaction requests that are subsequent to the write transaction that just completed. After all write transactions, on which a given read transaction request is contingent, have been performed on the PCI bus and their write contingency flags cleared, in step 150 in FIG. 5, the read transaction request has no contingencies and can proceed to the PCI bus.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system, comprising:
   a CPU;
   a memory coupled to the CPU via a host bus; and
   an adapter unit that couples a first peripheral bus to the host bus or a second peripheral bus, wherein the adapter unit comprises a multi-entry write buffer and also comprises a multi-entry read buffer in which read transactions can be stored pending execution, said adapter unit also has first and second interfaces that handle split transactions and wherein the adapter unit implements ordering rules to support multi-threading and the selective ordering of read transactions, write transactions and split transactions,
   wherein the adapter unit also comprises a read context register associated with each entry of the read buffer, each read context register comprising a plurality of write contingency bits, each write contingency bit being associated with a separate entry in the write buffer, and each write contingency bit indicating whether a write transaction is present in the write buffer and ahead of a read buffer read transaction corresponding to that write transaction.

2. The system of claim 1 wherein the adapter unit further comprises a plurality of read buffers and a plurality of write buffers and wherein the adapter unit implements buffer sharing to order a split read completion and a write transaction.

3. The system of claim 2 wherein the split read completion and the write transactions are queued in a single buffer whereby the split read completion and the write transactions occur on the peripheral bus according to an order in which the split read completion and the write transactions originally occurred.

4. The system of claim 2 further comprising a second set of registers that tracks information stored in the write buffers.

5. The system of claim 4 wherein at least one of the sets of registers stores a write context register bit that indicates whether an entry associated with the write context register bit is a write transaction associated with the first interface or a read transaction associated with the second interface.

6. The system of claim 1 wherein read context register bits encode different values dependant upon properties of the read transactions and write transactions involved.

7. The system of claim 6 wherein the adapter unit further comprises a first multiplexer that selects a write master to provide data to a plurality of write buffers.

8. The system of claim 7 wherein the adapter unit further comprises a second multiplexer that selects a read slave to provide data to the write buffers.

9. The system of claim 8 wherein the adapter unit further comprises a third multiplexer that selectively allows one of a read slave and a write master to access the write buffers.

10. The system of claim 9 wherein the adapter unit further comprises a de-multiplexer that selectively forwards write buffer data to one of the first interface and the second interface.

11. An adapter unit, comprising:
a peripheral bus manager having a first interface and a second interface;
a first buffer and a second buffer, wherein split transactions from the first interface and write transactions from the second interface are queued in the first buffer and wherein ordered and non-ordered read transactions are queued in the second buffer; and
a read context register associated with entry of the second buffer, each read context register comprising a plurality of write contingency bits, each write contingency bit being associated with a separate entry in the first buffer, and each write contingency bit indicating whether a write transaction is present in the write buffer and ahead of a read transaction corresponding to that write transaction.

12. The adapter unit of claim 11 wherein the first buffer comprises a write buffer and the second buffer comprises a read buffer that are both coupled to the first and second interfaces.

13. The adapter unit of claim 12 further comprising:
a set of write context registers configured to track content of the write buffers.

14. The adapter unit of claim 13 further comprising a plurality of multiplexers that select a write master to provide data to the write buffers, select a read slave to provide data to the write buffers, select one of a read slave and a write master to access the write buffers, and further comprising a de-multiplexer that forwards write buffer data to one of the first interface and the second interface.

* * * * *